United States Patent Office.

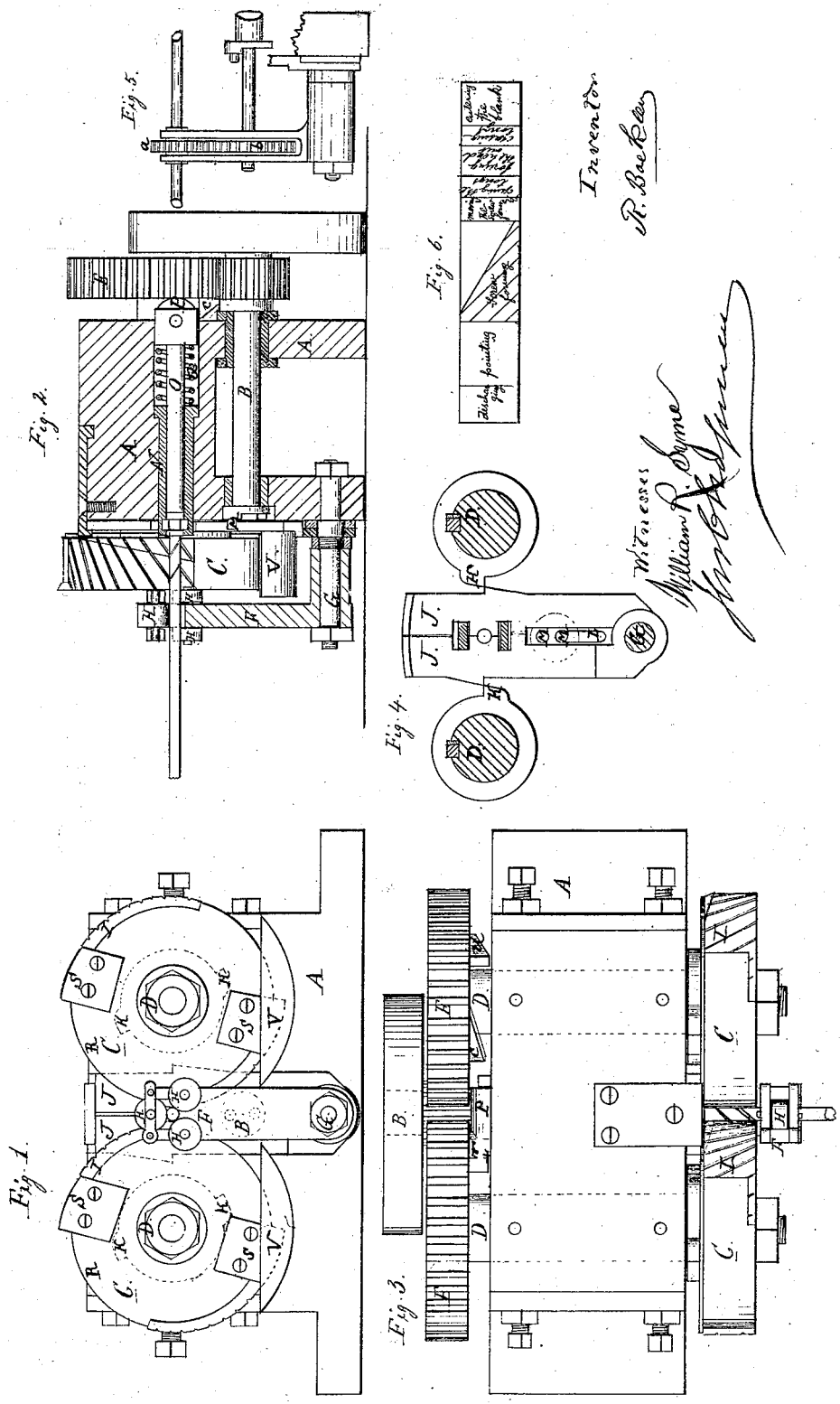

REINHOLD BOEKLEN, OF BROOKLYN, NEW YORK, ASSIGNOR OF ONE-HALF HIS RIGHT TO HENRY TORSTRICK, OF NEW YORK CITY.

Letters Patent No. 109,171, dated November 15, 1870; antedated November 10, 1870.

IMPROVEMENT IN MACHINES FOR MAKING SCREWS AND SCREW-NAILS.

The Schedule referred to in these Letters Patent and making part of the same.

I, REINHOLD BOEKLEN, of the city of Brooklyn, in the county of Kings and State of New York, have made certain new and useful Improvements in a Machine for Making Screws, Screw-Spikes, Nails, or Bolts, of which the following is a specification.

The first part of my invention relates to the combination of pressing-rollers, having corresponding portions with spiral grooves on their periphery, and being properly geared to rotate and press spiral grooves, or cause screw-threads to rise on the material, with an oscillating guide for holding said material while being threaded. Said guide holds the material outside of the portion being threaded in such a manner that it allows the material to revolve by the contact of the rolls, the latter causing a spiral rib or screw-thread to rise beyond the diameter of the material originally. The said guide has no direct contact or interference with the complete formation of said ribs, yet it is so constructed and situated that the material is, nevertheless, firmly guided in the plane of the axis of both of the rollers, while, at the same time, the metal is allowed to yield liberally to the pressure of the rollers toward the axis of either, and thereby allowing the material to receive liberally the pressure from the rollers without causing the material, in the direction of the plane of the axis of the rollers, to rub and bind in the guide which holds it.

The second part of the invention relates to the combination of said pressing-rollers, which have certain portions of their peripheries that do not engage the material, with said guide for holding the material, and a clamp and header, connected and provided with mechanism for operating said clamp and header, in correspondence with said rollers, in such a manner that, while said portions of the rollers not engaging the material pass the latter, a head is formed on it, or the material clamped and headed, and is brought immediately after, with its portion to be threaded, in contact with the portions spirally grooved of the rollers. By these means, in manufacturing screw-bolts, screw-spikes, or nails, the processes of heading and threading are combined to follow each other simultaneously, that the material can be passed through both processes in once heating it, and, consequently, reducing the cost of manufacturing said articles materially; and It relates, thirdly, to the aforesaid rollers, with the aforesaid portions grooved, and those not engaging, and the said guide, in combination with cutters or pointers situated on the ends of the rolls, for cutting off the blank, and, at the same time, forming a point on the screw or nail being made.

The fourth part of my invention relates to the combination of all the devices named above, viz., the rollers, with spiral-grooved portions or dies, the cutters or pointers, the guide, clamping-dies, and header, by means of which screw-bolts, nails, or screw-spikes are produced in once heating direct from the stock, and in a rapid manner, and with accuracy.

In the drawing—

Figure 1 represents a front view of a machine for making screws, nails, screw-spikes, and bolts, with my improvements.

Figure 2 is a vertical central cross-section of the same.

Figure 3, a top view of the same.

Figure 4 is a detached front view of the clamp for heading, showing also the cams for operating the same.

Figure 5 represents a modification of the guide and mechanism for both of holding and rotating the material.

Figure 6 is a diagram, showing the proportional time of the motions of the machine.

Similar letters of reference indicate corresponding parts in the several figures.

A represents the frame of the machine, provided with proper bearings for the driving-shaft B, which is located centrally in the lower part.

C C represent the adjustable pressing-rollers, which are arranged on the front face of the frame A, and are mounted upon horizontal shafts D D, having their bearings in the frame A, and are made adjustable in the usual manner.

The shaft B is parallel with the shafts D D, and arranged centrally, or at equal distance from either of the shafts D D.

The rollers C C are of equal diameter, and have gear-wheels E E upon the rear portion of their shafts D D, which are both engaged by a pinion upon the shaft B, so that these rollers C C have the same speed on their periphery, and revolve in the same direction.

In front, and in the joint plane of the axis of the rollers C C, I have a guide, F, for holding the material between the rolls, and parallel with the axis of the rolls, at the junction of said rolls.

Instead of having said guide fixed permanently, I have the same pivoted upon the stud G, which is fixed centrally on the lower portion of the front part of the frame.

The object of pivoting said guide is for the purpose of allowing the material, when under pressure in being threaded, to revolve by the friction of the rolls in the guide liberally, and yield to the position, directed by the pressing-faces, more or less toward the center of either roller.

The portion of the guide which holds the material has no part which comes in contact with that portion of the material which is under operation of being threaded, as the guide supports the rod back of that part which is to form the screw, so that, in raising the rib or screw-thread upon the material or rod, the same can freely rise to a sharp edge, and conform to the shape of the spiral-grooved portions of the rolls, and the finished bolt, screw, or nail can be discharged unmolested by the guide.

For ordinary screws of certain diameter I provide the guide F, with friction-rollers H H, to allow the rod to rotate in said guide more freely, and with less friction, than it would have in a simple tubular guide.

In making screws of small diameter, and when the rod is small, or whenever it is not desired to rotate the rod, or when incapable of being rotated by friction of the faces of the rollers C C pressing it, I prefer to furnish said guide with the harmonizing motion for turning the material with corresponding speed as that of the pressing-faces, which may be readily had by means of furnishing the guide with a loose bush, as seen in fig. 5, capable of turning and holding the material, and by having a gear, $a$, upon said bush, engaging or receiving motion from the shaft B by means of gear-wheels or pulleys, as shown at $b$, so that the material is furnished with positive rotary motion, and does not depend upon any friction caused by the pressing-faces of the rolls, for turning it.

I I represent the raised adjustable portions, or faces, or dies, upon the rollers, having spiral or diagonal grooves in them, corresponding with the kind of rib or screw-thread which is desired to be produced upon the screw being made.

Between the grooves $i$ $i$ the faces I I are made sufficiently eccentric to raise or displace the metal, and thereby cause the ribs or screw-threads to rise to the proper form, and to project, as desired, above the body of the screw.

Two or more faces, or dies I I, are arranged upon the periphery of the rolls, so that the said rolls may produce two or more screws at every single revolution of said rolls C C.

J J represent the clamping-dies, which are arranged on the frame A, back of the rolls C C. They are both made flat, and are hinged to the stud G, and have each a half opening in their faces, to grasp and surround the material at the portion of the neck of the bolt or nail behind the part which is to form the head, and the opening in said clamping-dies for holding the material is located in line with the opening in the guide F.

In order to operate the clamps, I arrange upon the front ends of the shafts D D, or upon the rear portion of the rollers C C, cams K K, one for each of the clamping-levers, and for each die I I, as shown in fig. 4.

By means of these cams the clamps are closed. For opening them I employ a spring, L, situated between them, and small studs or cams M M, fixed upon the front end of the shaft B, which press against the lever portion of the clamping-dies.

N represents an adjustable bush, located in a central opening in the frame A, which opening is, of course, in line with the front guide F, and corresponding with the opening in the clamping-dies.

In the fore part of this bush, and at right angles thereto, work the clamping-dies.

A header, O, is fitted to work in said bush N in such manner that it may slide freely in it.

In making small wood-screws, nails, and countersunk headed screws, a header is used which has a projection on its face for forming the nick in the screw-head.

The rear part of the header is furnished with a friction-cam or roller, P, projecting through the rear of the frame A, so that, by means of cams $c$ $c$, located on the faces of the gear-wheels E E, or on one of them, the header is forced toward the clamping-dies at the time they are clamping the rod, whereby a head is upset or formed upon the material or rod, while clamped, by the header O.

By the employment of a spring, Q, arranged on the header O, the same is returned toward the gear-wheels E, ready for another operation.

This header may be of any form desired, and the same may be operated in any convenient manner, from any of the rear working parts, and provided with mechanism for having a powerful leverage, according to the kind and shape of head desired.

The portions R R of the said rolls C C are sufficiently lower than the portions, faces, or dies I I, so that, whenever these portions R pass the material, no engagement of the rollers with the material takes place, and it is at those periods of the revolution of the rolls that the clamping-dies and the header are operating upon the material.

S S represent adjustable cutters or pointers upon the rollers, so shaped that the same are capable of pressing the material gradually to a point as they come in contact, and in that manner form the point of a nail, or spike, or screw.

These cutters or pointers rise sufficiently on each roller, so that their last parts, in passing each other, nearly meeting one another, causes the material to be separated and cut. They are located on the front part of the rollers, and beyond, so as to operate after the dies I I, at the required distance from the rear faces of the rolls, to point and cut the bolt or spike of the desired length.

For bolts not requiring a point, I make said pointers so that one of them overlaps the other in passing, and projects down upon the side of the other, as common in rotary cutters for cutting metal rods or wire.

When the machine is used for making screws, screw-spikes, or nails requiring to be pointed on the end of their shank, the said pointers are both tapering toward the rear end of the rollers, with the pointed edge of both alike, and joining each other at the junction of the rollers whenever passing each other.

By continuing the spiral grooves of the dies I I over onto the pointers, a gimlet-point or the screw-thread is formed on the point of the screw or nail.

Besides the cams $c$ $c$ on the face of the gear-wheels E E, I have also similar cams, T and U, of which the cam T is used for the purpose of giving the header O a forward motion, to cause the material, after being headed, to be slid in proper position between the rolls, the head of screw resting against the side of the rolls while the faces I I thread the screw.

The cam U has for its purpose the discharging of the bolt, or screw, or nail, after being cut off.

In working the machine, water-tanks V V may be located under the rolls, and furnished with a small stream of cold water, so that the raised portions I I and pointers S S are cooled in passing through the water in their rotation. The iron rod or bar is heated by passing through a furnace near the machine, and is, by means of proper feed-motion in front of the machine, forwarded, at the time of the revolution of the rolls, immediately after the passing of the pointers S S, after the cam U has effected the discharge of the former worked bolt or screw. The said material is sufficiently entered between the clamping-dies to stop against the header O, the cams K K thereafter forcing the clamps together, and causing the material near its end to be held tightly, so that, the cam $c$, in forcing immediately thereafter the header O against the end of the material, a head is formed on the rod against the clamps J J, and also a nick in the head of the blank formed by the header at the same time. The header O hereafter retires, and the clamps relieve the material, they being forced apart by the cams M M and spring L.

By means of the cam T, the material is thrown forward and adjusted to meet the faces I I, to be threaded by the motion of the rollers, the faces or dies I I press the material, and cause the rising of the screw-thread thereon, until the said faces have passed, and the pointers S S engage the material, and press a point on the same, and sever the blank from the rod, headed, threaded, and nicked, and completely formed, with a point of the desired shape for a spike-screw, nail-screw, or bolt, as the case may be, which, by means of the header O and the cam U, is finally discharged from the machine.

If the article is to have a plain head, a plain-faced header is used.

The adjustable dies or faces I I may be changed for those having less or greater pitch of the grooves, according to the style and number of screw-threads required.

I claim as my invention—

1. The pivoted and oscillating guide F, in combination with the rolls C C and dies I I, as and for the purpose set forth.

2. The combination of the rolls C C, dies I I, clamping-dies J J, and header O, substantially as and for the purpose herein described.

3. The combination of the rolls C C, dies I I, cutters or pointers S S, and guide F, substantially as and for the purpose herein stated.

4. The combination of the rolls C C, dies I I, cutters or pointers S S, guide F, clamping-dies J J, and header O, substantially as and for the purpose herein shown.

R. BOEKLEN.

Witnesses:
WILLIAM R. SYME,
JAS. CHIPMAN.